(12) United States Patent
Karagoz et al.

(10) Patent No.: US 12,205,311 B1
(45) Date of Patent: Jan. 21, 2025

(54) SYSTEM FOR TRAINING NEURAL NETWORKS THAT PREDICT THE PARAMETERS OF A HUMAN MESH MODEL USING DENSE DEPTH AND PART-BASED UV MAP ANNOTATIONS

(71) Applicant: Bertec Corporation, Columbus, OH (US)

(72) Inventors: Batuhan Karagoz, Ankara (TR); Emre Akbas, Ankara (TR); Bedirhan Uguz, Pittsburgh, PA (US); Ozhan Suat, Ankara (TR); Necip Berme, Worthington, OH (US); Mohan Chandra Baro, Columbus, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 18/382,838

(22) Filed: Oct. 23, 2023

Related U.S. Application Data

(63) Continuation-in-part of application No. 18/195,777, filed on May 10, 2023, now Pat. No. 11,798,182.
(Continued)

(51) Int. Cl.
*G06T 7/50* (2017.01)
*G06V 10/75* (2022.01)
*G06V 20/40* (2022.01)

(52) U.S. Cl.
CPC .............. *G06T 7/50* (2017.01); *G06V 10/751* (2022.01); *G06V 20/46* (2022.01);
(Continued)

(58) Field of Classification Search
CPC ............ G06T 7/50; G06T 2207/20081; G06T 2207/20084; G06T 2207/30201; G06V 20/46
(Continued)

(56) References Cited

U.S. PATENT DOCUMENTS 6,038,488 A 3/2000 Barnes et al.
6,113,237 A 9/2000 Ober et al.
(Continued)

OTHER PUBLICATIONS

Kocabas, Muhammed, Nikos Athanasiou, and Michael J. Black. "Vibe: Video inference for human body pose and shape estimation." Proceedings of the IEEE/CVF conference on computer vision and pattern recognition. 2020. (Year: 2020).*
(Continued)

*Primary Examiner* — Jonathan S Lee
(74) *Attorney, Agent, or Firm* — The Law Office of Patrick F. O'Reilly III, LLC

(57) ABSTRACT

A system for training neural networks that predict the parameters of a human mesh model is disclosed herein. The system includes at least one camera and a data processor configured to execute computer executable instructions for: receiving a first frame and a second frame of a video from the at least one camera; extracting first and second image data from the first and second frames of the video; inputting the sequence of frames of the video into a human mesh estimator module, the human mesh estimator module estimating mesh parameters from the sequence of frames of the video so as to determine a predicted mesh; and generating a training signal for input into the human mesh estimator module by using a two-dimensional keypoint loss module that compares a first set of two-dimensional image-based keypoints to a second set of two-dimensional model-based keypoints.

9 Claims, 6 Drawing Sheets

Related U.S. Application Data

(60) Provisional application No. 63/354,497, filed on Jun. 22, 2022.

(52) U.S. Cl.
CPC .............. *G06T 2207/20081* (2013.01); *G06T 2207/20084* (2013.01); *G06T 2207/30201* (2013.01)

(58) Field of Classification Search
USPC ........................................................ 382/100
See application file for complete search history.

(56) References Cited

U.S. PATENT DOCUMENTS

| | | | |
|---|---|---|---|
| 6,152,564 A | 11/2000 | Ober et al. |
| 6,295,878 B1 | 10/2001 | Berme |
| 6,354,155 B1 | 3/2002 | Berme |
| 6,389,883 B1 | 5/2002 | Berme et al. |
| 6,936,016 B2 | 8/2005 | Berme et al. |
| 8,181,541 B2 | 5/2012 | Berme |
| 8,315,822 B2 | 11/2012 | Berme et al. |
| 8,315,823 B2 | 11/2012 | Berme et al. |
| D689,388 S | 9/2013 | Berme |
| D689,389 S | 9/2013 | Berme |
| 8,543,540 B1 | 9/2013 | Wilson et al. |
| 8,544,347 B1 | 10/2013 | Berme |
| 8,643,669 B1 | 2/2014 | Wilson et al. |
| 8,700,569 B1 | 4/2014 | Wilson et al. |
| 8,704,855 B1 | 4/2014 | Berme et al. |
| 8,764,532 B1 | 7/2014 | Berme |
| 8,847,989 B1 | 9/2014 | Berme et al. |
| D715,669 S | 10/2014 | Berme |
| 8,902,249 B1 | 12/2014 | Wilson et al. |
| 8,915,149 B1 | 12/2014 | Berme |
| 9,032,817 B2 | 5/2015 | Berme et al. |
| 9,043,278 B1 | 5/2015 | Wilson et al. |
| 9,066,667 B1 | 6/2015 | Berme et al. |
| 9,081,436 B1 | 7/2015 | Berme et al. |
| 9,168,420 B1 | 10/2015 | Berme et al. |
| 9,173,596 B1 | 11/2015 | Berme et al. |
| 9,200,897 B1 | 12/2015 | Wilson et al. |
| 9,277,857 B1 | 3/2016 | Berme et al. |
| D755,067 S | 5/2016 | Berme et al. |
| 9,404,823 B1 | 8/2016 | Berme et al. |
| 9,414,784 B1 | 8/2016 | Berme et al. |
| 9,468,370 B1 | 10/2016 | Shearer |
| 9,517,008 B1 | 12/2016 | Berme et al. |
| 9,526,443 B1 | 12/2016 | Berme et al. |
| 9,526,451 B1 | 12/2016 | Berme |
| 9,558,399 B1 | 1/2017 | Jeka et al. |
| 9,568,382 B1 | 2/2017 | Berme et al. |
| 9,622,686 B1 | 4/2017 | Berme et al. |
| 9,763,604 B1 | 9/2017 | Berme et al. |
| 9,770,203 B1 | 9/2017 | Berme et al. |
| 9,778,119 B2 | 10/2017 | Berme et al. |
| 9,814,430 B1 | 11/2017 | Berme et al. |
| 9,829,311 B1 | 11/2017 | Wilson et al. |
| 9,854,997 B1 | 1/2018 | Berme et al. |
| 9,916,011 B1 | 3/2018 | Berme et al. |
| 9,927,312 B1 | 3/2018 | Berme et al. |
| 10,010,248 B1 | 7/2018 | Shearer |
| 10,010,286 B1 | 7/2018 | Berme et al. |
| 10,085,676 B1 | 10/2018 | Berme et al. |
| 10,117,602 B1 | 11/2018 | Berme et al. |
| 10,126,186 B2 | 11/2018 | Berme et al. |
| 10,216,262 B1 | 2/2019 | Berme et al. |
| 10,231,662 B1 | 3/2019 | Berme et al. |
| 10,264,964 B1 | 4/2019 | Berme et al. |
| 10,331,324 B1 | 6/2019 | Wilson et al. |
| 10,342,473 B1 | 7/2019 | Berme et al. |
| 10,390,736 B1 | 8/2019 | Berme et al. |
| 10,413,230 B1 | 9/2019 | Berme et al. |
| 10,463,250 B1 | 11/2019 | Berme et al. |
| 10,527,508 B2 | 1/2020 | Berme et al. |
| 10,555,688 B1 | 2/2020 | Berme et al. |
| 10,646,153 B1 | 5/2020 | Berme et al. |
| 10,722,114 B1 | 7/2020 | Berme et al. |
| 10,736,545 B1 | 8/2020 | Berme et al. |
| 10,765,936 B2 | 9/2020 | Berme et al. |
| 10,803,990 B1 | 10/2020 | Wilson et al. |
| 10,853,970 B1 | 12/2020 | Akbas et al. |
| 10,856,796 B1 | 12/2020 | Berme et al. |
| 10,860,843 B1 | 12/2020 | Berme et al. |
| 10,945,599 B1 | 3/2021 | Berme et al. |
| 10,966,606 B1 | 4/2021 | Berme |
| 11,033,453 B1 | 6/2021 | Berme et al. |
| 11,052,288 B1 | 7/2021 | Berme et al. |
| 11,054,325 B2 | 7/2021 | Berme et al. |
| 11,074,711 B1 | 7/2021 | Akbas et al. |
| 11,097,154 B1 | 8/2021 | Berme et al. |
| 11,158,422 B1 | 10/2021 | Wilson et al. |
| 11,182,924 B1 | 11/2021 | Akbas et al. |
| 11,262,231 B1 | 3/2022 | Berme et al. |
| 11,262,258 B2 | 3/2022 | Berme et al. |
| 11,301,045 B1 | 4/2022 | Berme et al. |
| 11,311,209 B1 | 4/2022 | Berme et al. |
| 11,321,868 B1 | 5/2022 | Akbas et al. |
| 11,337,606 B1 | 5/2022 | Berme et al. |
| 11,348,279 B1 | 5/2022 | Akbas et al. |
| 11,458,362 B1 | 10/2022 | Berme et al. |
| 11,521,373 B1 | 12/2022 | Akbas et al. |
| 11,540,744 B1 | 1/2023 | Berme |
| 11,604,106 B2 | 3/2023 | Berme et al. |
| 11,631,193 B1 | 4/2023 | Akbas et al. |
| 11,688,139 B1 | 6/2023 | Karagoz et al. |
| 11,705,244 B1 | 7/2023 | Berme |
| 11,712,162 B1 | 8/2023 | Berme et al. |
| 11,790,536 B1 | 10/2023 | Berme et al. |
| 11,798,182 B1 | 10/2023 | Karagoz et al. |
| 11,816,258 B1 | 11/2023 | Berme et al. |
| 11,826,601 B1 | 11/2023 | Berme |
| 11,850,078 B1 | 12/2023 | Berme |
| 11,857,331 B1 | 1/2024 | Berme et al. |
| 11,865,407 B1 | 1/2024 | Berme et al. |
| 11,911,147 B1 | 2/2024 | Berme et al. |
| 2003/0216656 A1 | 11/2003 | Berme et al. |
| 2008/0228110 A1 | 9/2008 | Berme |
| 2011/0277562 A1 | 11/2011 | Berme |
| 2012/0266648 A1 | 10/2012 | Berme et al. |
| 2012/0271565 A1 | 10/2012 | Berme et al. |
| 2015/0096387 A1 | 4/2015 | Berme et al. |
| 2016/0245711 A1 | 8/2016 | Berme et al. |
| 2016/0334288 A1 | 11/2016 | Berme et al. |
| 2018/0024015 A1 | 1/2018 | Berme et al. |
| 2019/0078951 A1 | 3/2019 | Berme et al. |
| 2020/0139229 A1 | 5/2020 | Berme et al. |
| 2020/0408625 A1 | 12/2020 | Berme et al. |
| 2021/0333163 A1 | 10/2021 | Berme et al. |
| 2022/0178775 A1 | 6/2022 | Berme et al. |

OTHER PUBLICATIONS

Nguyen, Phong, et al. "Human View Synthesis using a Single Sparse RGB-D Input." arXiv preprint arXiv:2112.13889 (2021). (Year: 2021).*

Yang, Ji, et al. "3D pose estimation and future motion prediction from 2D images." Pattern Recognition 124 (2021): 108439. (Year: 2021).*

M. Kocabas, S. Karagoz, and E. Akbas. Multiposenet: Fast multi-person pose estimation using pose residual network. In European Conference on Computer Vision. (Jul. 2018) pp. 1-17.

R. Güler, N. Neverova, and I. Kokkinos. Densepose: Dense human pose estimation in the wild. In EEE/CVF Conference on Computer Vision and Pattern Recognition (CVPR). (Jun. 2018) pp. 7297-7306.

Y. Jafarian and H. S. Park. Learning high fidelity depths of dressed humans by watching social media dance videos. In The IEEE Conference on Computer Vision and Pattern Recognition (CVPR). (Mar. 2021) pp. 12753-12762.

(56) References Cited

OTHER PUBLICATIONS

C. Mayer, M. Danelljan, D. P. Paudel, and L. Van Gool. Learning target candidate association to keep track of what not to track. arXiv preprint arXiv:2103.16556 (Mar. 2021) pp. 13444-13454.

Y. Raaj, H. Idrees, G. Hidalgo, and Y. Sheikh. Efficient online multi-person 2d pose tracking with recurrent spatio-temporal affinity fields. In Proceedings of the IEEE/CVF Conference on Computer Vision and Pattern Recognition. (Jun. 2019) pp. 4620-4628.

S. Tang, F. Tan, K. Cheng, Z. Li, S. Zhu, and P. Tan. A neural network for detailed human depth estimation from a single image. In Proceedings of the IEEE/CVF International Conference on Computer Vision. (Oct. 2019) pp. 1-10.

Guan, Shanyan, et al. "Out-of-domain human mesh reconstruction via dynamic bilevel online adaptation." IEEE Transactions on Pattern Analysis and Machine Intelligence 45.4 (2022): 5070-5086. (Year: 2022).

Guler, Riza Alp, and Iasonas Kokkinos. "Holopose: Holistic 3d human reconstruction in-the-wild." Proceedings of the IEEE/CVF Conference on Computer Vision and Pattern Recognition. 2019. (Year: 2019).

Hu, Tao, et al. "Hvtr: Hybrid volumetric-textural rendering for human avatars." 2022 International Conference on 3D Vision (3DV). IEEE, 2022. (Year: 2022).

Kim, Hyomin, et al. "LaplacianFusion: Detailed 3D Clothed-Human Body Reconstruction." ACM Transactions on Graphics (TOG) 41.6 (2022): 1-14. (Year: 2022).

Kundu, Jogendra Nath, et al. "Appearance consensus driven self-supervised human mesh recovery." Computer Vision—ECCV 2020: 16th European Conference, Glasgow, UK, Aug. 23-28, 2020, Proceedings, Part I 16. Springer International Publishing, 2020. (Year: 2020).

Li, Kun, et al. "Image-guided human reconstruction via multi-scale graph transformation networks." IEEE Transactions on Image Processing 30 (2021): 5239-5251. (Year: 2021).

Liu, Xun-Yu, et al. "3D Human Pose and Shape Estimation from Video." 2022, CPSCom, pp. 617-624 (Year: 2022).

Ma, Liqian, et al. "Direct Dense Pose Estimation." 2021 International Conference on 3D Vision (3DV). IEEE, 2021. (Year: 2021).

Qiao, Yi-Ling, Alexander Gao, and Ming Lin. "Neuphysics: Editable neural geometry and physics from monocular videos." Advances in Neural Information Processing Systems 35 (2022): 12841-12854. (Year: 2022).

Wang, Zhe. Robust Estimation of 3D Human Body Pose with Geometric Priors. Diss. University of California, Irvine, 2021. (Year: 2021).

Wang, Zhe, Jimei Yang, and Charless Fowlkes. "The best of both worlds: combining model-based and nonparametric approaches for 3D human body estimation." Proceedings of the IEEE/CVF Conference on Computer Vision and Pattern Recognition. 2022. (Year: 2022).

Xu, Yuanlu, Song-Chun Zhu, and Tony Tung. "Denserac: Joint 3d pose and shape estimation by dense render-and-compare." Proceedings of the IEEE/CVF International Conference on Computer Vision. 2019. (Year: 2019).

Notice of Allowance in U.S. Appl. No. 18/195,777, mailed on Jun. 20, 2023.

* cited by examiner

SYSTEM FOR TRAINING NEURAL NETWORKS THAT PREDICT THE PARAMETERS OF A HUMAN MESH MODEL USING DENSE DEPTH AND PART-BASED UV MAP ANNOTATIONS

CROSS-REFERENCE TO RELATED APPLICATIONS

This is a continuation-in-part of U.S. Nonprovisional patent application Ser. No. 18/195,777, entitled "System For Training Neural Networks That Predict The Parameters Of A Human Mesh Model Using Dense Depth And Part-Based UV Map Annotations", filed on May 10, 2023; which claims the benefit of U.S. Provisional Patent Application No. 63/354,497, entitled "System For Training Neural Networks That Predict The Parameters Of A Human Mesh Model Using Dense Depth And Part-Based UV Map Annotations", filed on Jun. 22, 2022, the disclosure of each of which is hereby incorporated by reference as if set forth in its entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to neural networks that predict the parameters of a human mesh model. More particularly, the invention relates to a system for training neural networks that predict the parameters of a human mesh model using dense depth and part-based UV map annotations.

2. Background

Estimating 3D human pose and shape (HPS) from videos is an important problem in computer vision with many applications in fields, such as graphics animation, robotics, AR/VR and biomechanics. It is also a very challenging task in monocular settings, due to depth ambiguity that arises from projective geometry. With the introduction of deep convolutional neural network (CNN) based methods, tremendous progress has been achieved where Deep CNN models implicitly learn to resolve depth ambiguity using various image cues and human body priors such as illumination, photometric consistency, anatomical constraints and human dynamics in video HPS estimation.

Possibly, the most crucial aspect in these deep learning based methods is to provide any kind of depth information to the model during training. Datasets collected in lab settings with expensive motion capture systems provide this depth information as body keypoint locations in a global reference frame. However, such datasets are not possible to collect in-the-wild or even in-the-lab monocular settings where applications of HPS are the most prevalent. As an alternative, ordinal depth information generated by human annotators has also been used previously, although such annotations are still hard to obtain and do not provide significant improvement. Recently, iterative optimization based model fitting approaches have also been proposed to generate pseudo-3D labels from 2D observations. RGB-D cameras present a different alternative to the problem with cheaper acquisition costs. It has been shown that introducing depth channel to 3D human pose and shape estimation improves performance significantly. Despite this, using dense pixel-wise depth information during model training has not been addressed yet.

What is needed, therefore, is a system for training neural networks that predict the parameters of a human mesh model using dense depth and part-based UV map annotations, wherein an effective training signal is generated for input into the human mesh estimator module by using at least one of a depth loss module and a rigid transform loss module.

BRIEF SUMMARY OF EMBODIMENTS OF THE INVENTION

Accordingly, the present invention is directed to a system for training neural networks that predict the parameters of a human mesh model which substantially obviates one or more problems resulting from the limitations and deficiencies of the related art.

In accordance with one or more embodiments of the present invention, there is provided a system for training neural networks that predict the parameters of a human mesh model. The system includes at least one camera, the at least one camera configured to capture a sequence of frames of a video, the sequence of frames of the video including at least a first frame and a second frame; and a data processor including at least one hardware component, the data processor configured to execute computer executable instructions, the computer executable instructions comprising instructions for: (i) receiving the first frame and the second frame of the video from the at least one camera; (ii) extracting first image data from the first frame of the video; (iii) extracting second image data from the second frame of the video; (iv) inputting the sequence of frames of the video into a human mesh estimator module, the human mesh estimator module estimating mesh parameters from the sequence of frames of the video so as to determine a human mesh model; and (v) generating a training signal for input into the human mesh estimator module by using a two-dimensional keypoint loss module that compares a first set of two-dimensional image-based keypoints to a second set of two-dimensional model-based keypoints.

In a further embodiment of the present invention, the data processor is further configured to estimate the first set of two-dimensional image-based keypoints from at least one of the first image data or the second image data using a two-dimensional keypoint estimator.

In yet a further embodiment, the data processor is further configured to estimate the first set of two-dimensional image-based keypoints from a training dataset that comprises two-dimensional ground truth keypoints.

In still a further embodiment, the data processor is further configured to estimate the second set of two-dimensional model-based keypoints by projecting the second set of two-dimensional model-based keypoints from the human mesh model.

In yet a further embodiment, when generating the training signal for input into the human mesh estimator module using the two-dimensional keypoint loss module, the data processor is further configured to minimize numerical differences between corresponding keypoints of the first set of two-dimensional image-based keypoints and the second set of two-dimensional model-based keypoints so as to ensure a precise alignment between the human mesh model and real-world images in the video.

In still a further embodiment, the data processor is further configured to generate depth maps and IUV maps for the first frame and the second frame of the video.

In yet a further embodiment, the data processor is configured to generate the depth maps using a human depth estimator module.

In still a further embodiment, the at least one camera comprises an RGB-D camera that outputs both image data and depth data, and the data processor is configured to generate the depth maps using the depth data from the RGB-D camera.

In yet a further embodiment, the data processor is configured to estimate the second set of two-dimensional model-based keypoints by additionally considering a movement of the human mesh model over a period of time.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

DETAILED DESCRIPTION OF EMBODIMENTS OF THE INVENTION

Hereinafter, a system and method is described that uses dense depth information in training video-based HPS estimation models in the form of a depth-based loss module that can be used in tandem with one or more other losses. The method described herein relies on dense correspondences between a human template mesh and pixelwise depth maps. Using these correspondences with part information for both human mesh and dense depth maps, several loss terms are defined. Mainly, the module described herein tries to minimize the discrepancy between rigid transformations of body parts calculated from mesh predictions of the model and depth maps. In this way, both RGB-D video datasets with ground truth depth and in-the-wild video datasets are leveraged without annotations using state-of-the-art depth estimation and dense keypoint prediction networks. The system described herein uses depth information to supervise human mesh learning.

Figure 6:
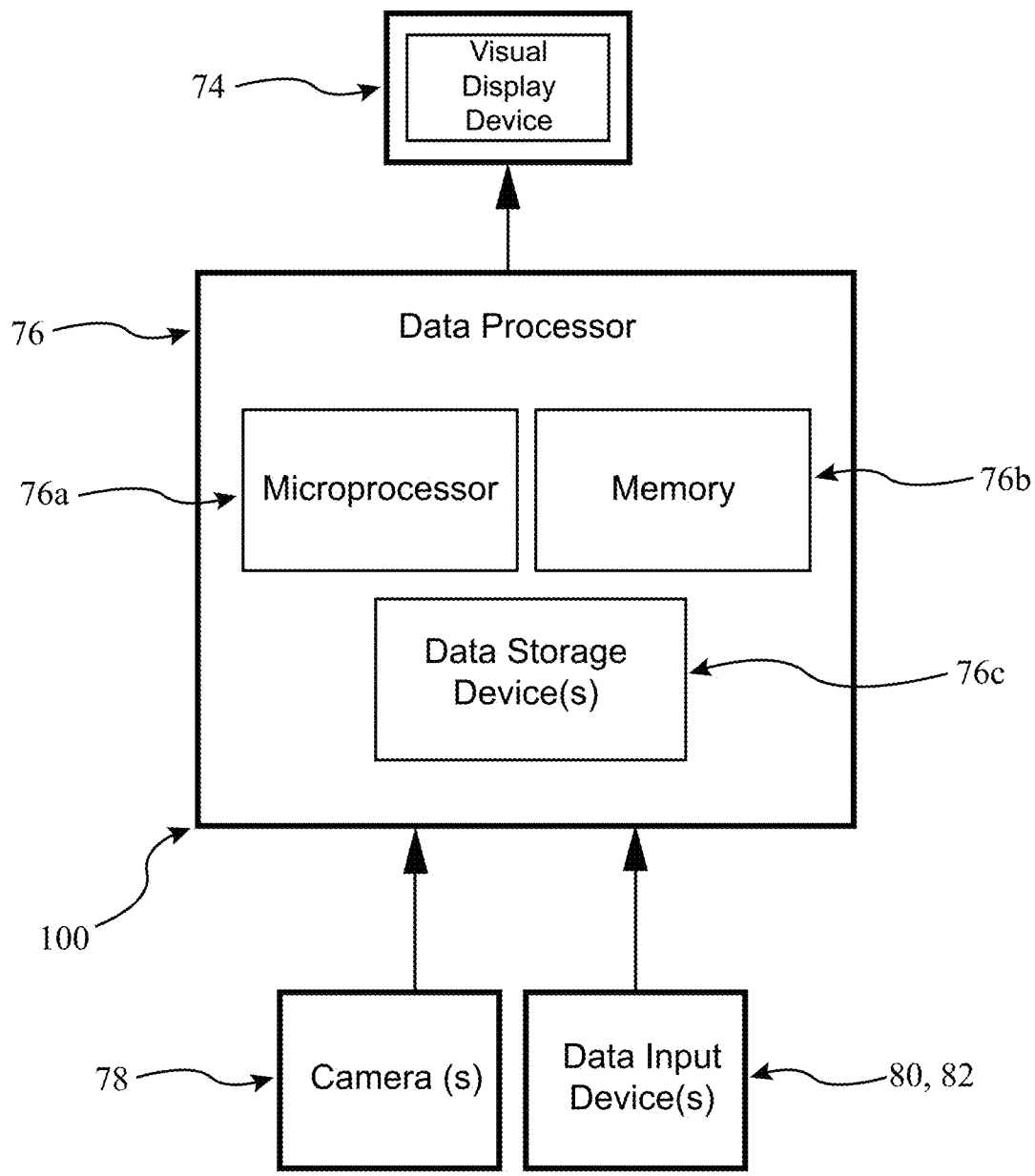
FIG. 6 is a block diagram of exemplary hardware components of the system described herein, according to an embodiment of the invention.

Now, turning again to FIG. 6, it can be seen that the illustrated data processor 76 of the human mesh generation system 100 described herein includes a microprocessor 76a for processing data, memory 76b (e.g., random access memory or RAM) for storing data during the processing thereof, and data storage device(s) 76c, such as one or more hard drives, compact disk drives, floppy disk drives, flash drives, or any combination thereof. As shown in FIG. 6, the camera(s) 78 and the visual display device 74 are operatively coupled to the data processor 76 such that data is capable of being transferred between these devices 74, 76, 78. Also, as illustrated in FIG. 6, a plurality of data input devices 80, 82, such as a keyboard and mouse, are diagrammatically shown in FIG. 6 as being operatively coupled to the data processor 76 so that a user is able to enter data into the data processing device 76. In some embodiments, the data processor 76 can be in the form of a desktop computer. For example, in the illustrative embodiment, the data processing device 76 coupled to the camera(s) 78 may have an Intel® Core i7 7th generation processor or greater, at least two NVIDIA® Geforce GTX 1080 Ti series graphics processing units (GPU) with at least eleven (11) gigabytes of memory, and thirty-two (32) gigabytes of random-access memory (RAM) or greater.

In the illustrative embodiment, the executable instructions stored on the computer readable media (e.g., data storage device(s) 76c) of the data processor 76 may include an operating system, such as Microsoft Windows®, a programming application, such as Python™ (e.g., a version older than 2.7 or 3.5), and other software modules, programs, or applications that are executable by the data processor 76. For example, in addition to the operating system, the illustrative system 100 may contain the following other software modules: (i) Keras-Tensorflow, a library for implementing deep neural network algorithms; (ii) OpenCV, a library for computer vision algorithms; (iii) NumPy, a library supporting large, multi-dimensional arrays and matrices, along with a large collection of high-level mathematical functions to operate on these arrays; and (iv) SciPy, a library used for scientific computing and technical computing.

1. System Functionality

Figure 1:
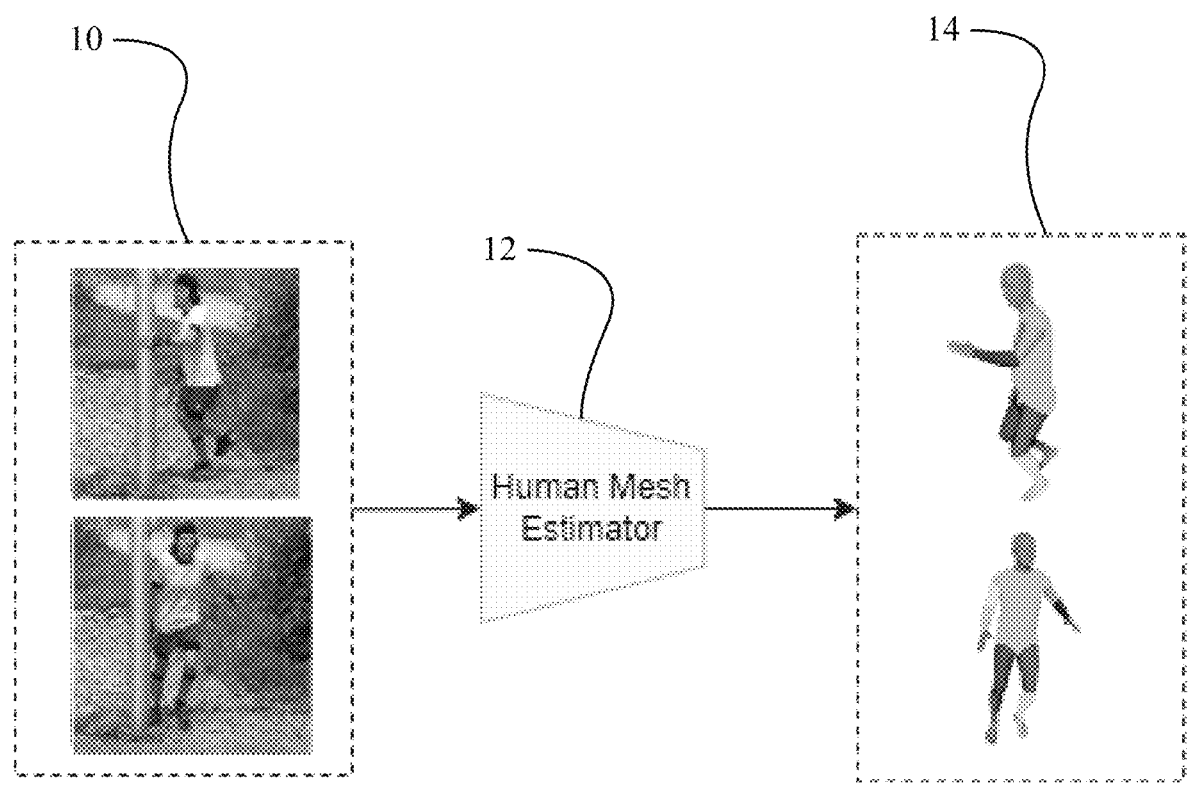
FIG. 1 is a schematic diagram illustrating human mesh model parameter estimation, according to an illustrative embodiment of the invention.

In the illustrative embodiment, the system described herein is a training pipeline for neural networks that take either a single image or a sequence of images from a video and predict parameters of a human body model. Referring to FIG. 1, the Human Mesh Estimator 12 is a neural network that takes either a single image or a sequence of images 10 from a video and predicts the corresponding human mesh parameters of a human body mesh model 14 described in Section 2 below. FIG. 1 is the system inference diagram. In FIG. 1, RGB data 10 is fed into a human mesh estimator 12, which outputs mesh parameters that are used to generate a mesh 14. The system facilitates a dataset of human videos (described in Section 6 below) with detected human bounding boxes, pixelwise depth annotations either collected from a depth camera or generated by a dense depth predictor and pixelwise dense mesh surface annotations in the form of IUV maps (described in Section 3 below) generated by another neural network for the frames of each video in the dataset. In general, a frame is an image with a particular timestamp. In the illustrative embodiment, the system uses backpropagation with Stochastic Gradient Descent to update model parameters using a number of loss functions: (i) Depth Loss compares predicted mesh with the respective depth map (described in Section 7 below) and (ii) Rigid Transform Loss uses two frames from the same video (described in Section 8 below). The Rigid Transform Loss calculates rigid transformations between frames for each body part using depth and IUV maps and warps the predicted mesh for the first frame using these rigid transformations and compares the warped mesh with the predicted mesh for the second frame. The entirety of the system is explained in detail in Sections 4-9 below.

An IUV map is often used in graphics processing. The black portion of the IUV map is the background. The IUV map indicates what body part a particular pixel belongs to. An IUV map is a dense prediction of keypoints, where each keypoint corresponds to a vertex in the mesh. In a particular frame, some of the vertices are not visible. Only the visible vertices in a particular frame are able to be compared. 3D positions of pixels can be constructed; a partial mesh is formed because only part of the body is visible in an image. The IUV map allows body parts to be identified over different frames (pixel positions for 3D vertex positions can be identified). For example, the IUV map tells you that a particular pixel corresponds to point 500 on the mesh. In other words, the IUV map indicates what each pixel in an image corresponds to on the body.

2. Human Body Model

In the illustrative embodiment, a human body mesh model comprises a Template Mesh T, parameters θ, a differentiable function W(θ, T) and a projection function Π. Template Mesh is an artist-designed static 3D Mesh of a human body with a fixed number of vertices and faces. Mesh topology is preserved through function W. From the template mesh, function W generates human bodies based on parameters θ within the range of θ. Projection function Π is a differentiable mapping from 3D space to 2D space which may or may not use mesh parameters θ to project 3D points in space to image pixels. In the illustrative embodiment, the function W generates the 3D coordinates of the mesh vertices from Template Mesh T and parameters θ. Projection function Π projects vertices onto 2D plane.

3. UV Decomposition of the Template Mesh

Texturizing meshes is a common part of graphic applications that is mainly used for storing textures as images and applying them across an animation of the mesh. Similarly, in the illustrative embodiment, Template Mesh vertices are separated into parts (I values) and each part is projected onto 2D surface where any point on the mesh surface has a 2D coordinate value (UV) in the range [0,1]. An IUV map is a mapping of image pixels to (I,U,V) triplets defining the mesh surface location for each pixel.

Figure 2:
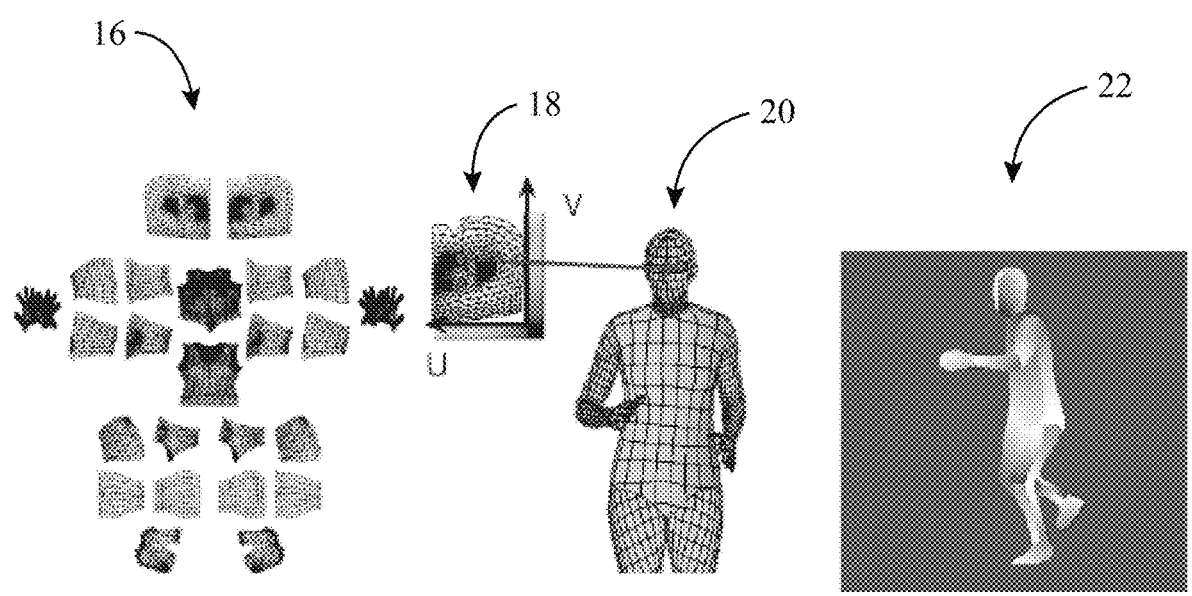
FIG. 2 is a schematic diagram illustrating 2D coordinate value (UV) decomposition, according to an illustrative embodiment of the invention.

As shown in FIG. 2, in the illustrative embodiment, for the UV part decomposition of the template mesh, mesh vertices are separated into parts 16 (I values) and each part is projected onto the 2D surface. Any point on the mesh surface 20 has a 2D coordinate value 18 (UV) between 0 and 1. An IUV map 22 is a mapping of image pixels to (I,U,V) triplets defining the mesh surface location for each pixel.

4. System Overview

Figure 3:
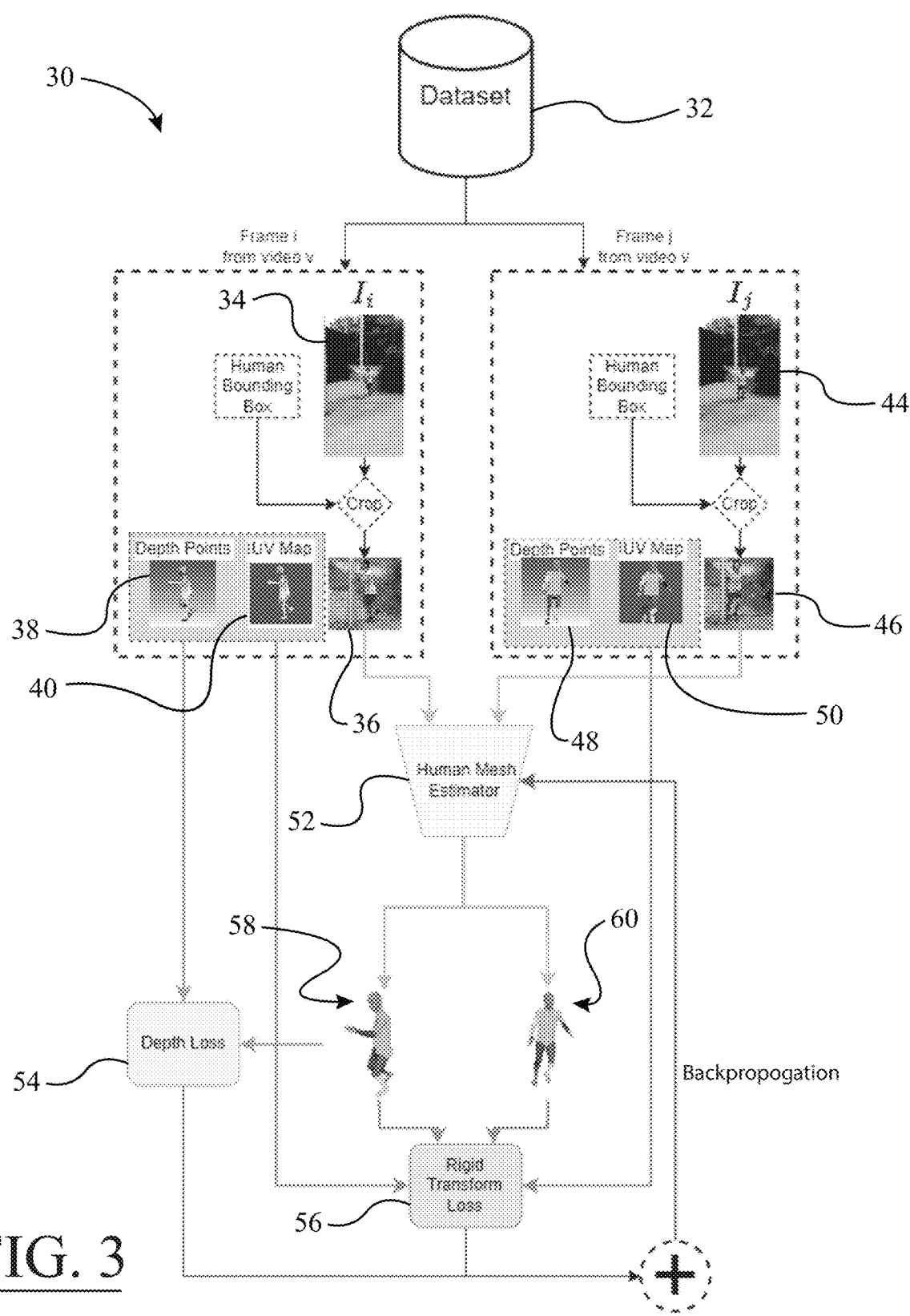
FIG. 3 is a schematic diagram of the overall architecture of the system described herein during the training thereof, according to an illustrative embodiment of the invention.

The overall architecture of the illustrative system is depicted in FIG. 3. FIG. 3 is the system training diagram 30. The training data set focuses on a single person. For each frame 34, 44 in FIG. 3, a RGB image 36, 46, a depth map 38, 48, and an IUV map 40, 50 is produced. Each module in FIG. 3 is detailed in Sections 5-9 provided below.

5. System Human Mesh Estimator

The core part of the illustrative system is the Human Mesh Parameter Estimator 52 which is trained by the system. The Human Mesh Parameter Estimator 52 can be of two different types: (i) a single frame estimator; and (ii) video estimators. In the case of a single frame estimator, the Human Mesh Parameter Estimator 52 takes a single cropped image/as input and estimates mesh parameters θ=E(I). A mesh is set of points connected by lines that produce polygon surfaces (3D mesh model). During training. N number of frame pairs are sampled such that each pair belongs to the same video and pair frames are close enough that there are a sufficient amount of point correspondences between IUV maps. In the case of video estimators, the Human Mesh Parameter Estimator 52 is a temporal model that takes a sequence of frames (a video) $I_1, \ldots I_L$ as input and estimates mesh parameters $\theta_1, \ldots \theta_L$=E ($I_1, \ldots I_L$). During training, an N number of videos are sampled and an arbitrary number of frame pairs are subsampled from each video. Although the illustrative embodiment of FIG. 3 depicts the Human Mesh Parameter Estimator 52 as a single frame estimator, the system operates the same for the video estimator case, as well. Depth Loss is applied to every frame, while Rigid Transform Loss is applied to selected frame pairs.

In the illustrative embodiment, the Human Mesh Estimator 52 estimates mesh parameters for each image. The Human Mesh Estimator 52 estimates points in 3D that define the mesh shape of the person. The Human Mesh Estimator 52 outputs the 3D vertex predictions of the mesh. Each part of the body mesh is considered a rigid body. Unlike keypoints, a mesh is dense-defined for each pixel. The mesh allows body information to be connected with depth information. The Human Mesh Estimator 52 estimates the 3D points of each vertex of the mesh. The Human Mesh Estimator 52 determines thousands of 3D points on the body (i.e., in essence, the Human Mesh Estimator 52 is estimating thousands of marker positions on the body). The mesh vertices are 3D locations of intersection points of the mesh lines.

6. System Dataset

In the illustrative embodiment, the Dataset 32 used for training is mainly comprised of videos showing at least one person from start to the end. For every frame, the dataset 32 includes a rectangular bounding box showing the position of the person in the frame and depth and IUV maps corresponding to bounding box cropped image. Bounding boxes can be obtained using an object tracker (e.g., KeepTrack—see ref. [3]) or a human pose tracker (e.g., STAF—see ref. [4]). Depth maps can be either obtained using a human depth estimator (see ref. [2]) or with a depth camera (see ref. [5]). That is, the depth information can be estimated from normal RGB data using a depth information model. The depth information can also be obtained using an RGB-D camera. In a depth map, each pixel has depth information. IUV maps can be obtained using DensePose (see ref. [1]).

7. System Depth Loss

In the illustrative embodiment, Depth Loss 54 penalizes the distance between 3D points backprojected from the depth map and their corresponding locations on the predicted mesh surface. These correspondences can be acquired because IUV maps are tied to the template mesh and predicted meshes share the same topology with the template mesh.

In the illustrative embodiment, for a frame/with depth map D and IUV map S, the corresponding position of each non-background depth pixel p∈D on the predicted mesh is calculated by barycentric mapping of S(p) over the predicted mesh W(E(I), T). Once the corresponding points V on the mesh surface and 3D depth points $D^{3D}$ are calculated, depth loss over all sampled frames $I_1, \ldots, I_N$ is defined as:

$$\mathcal{L}_{depth} = \frac{1}{N}\sum_{N}^{1}\|V_i - D_i^{3D}\|^2 \quad (1)$$

where $D_i^{3D}$ is the backprojection of $\{p \in D_i, D_i(p) > 0\}$ onto the 3D space using fixed camera parameters.

Figure 4:
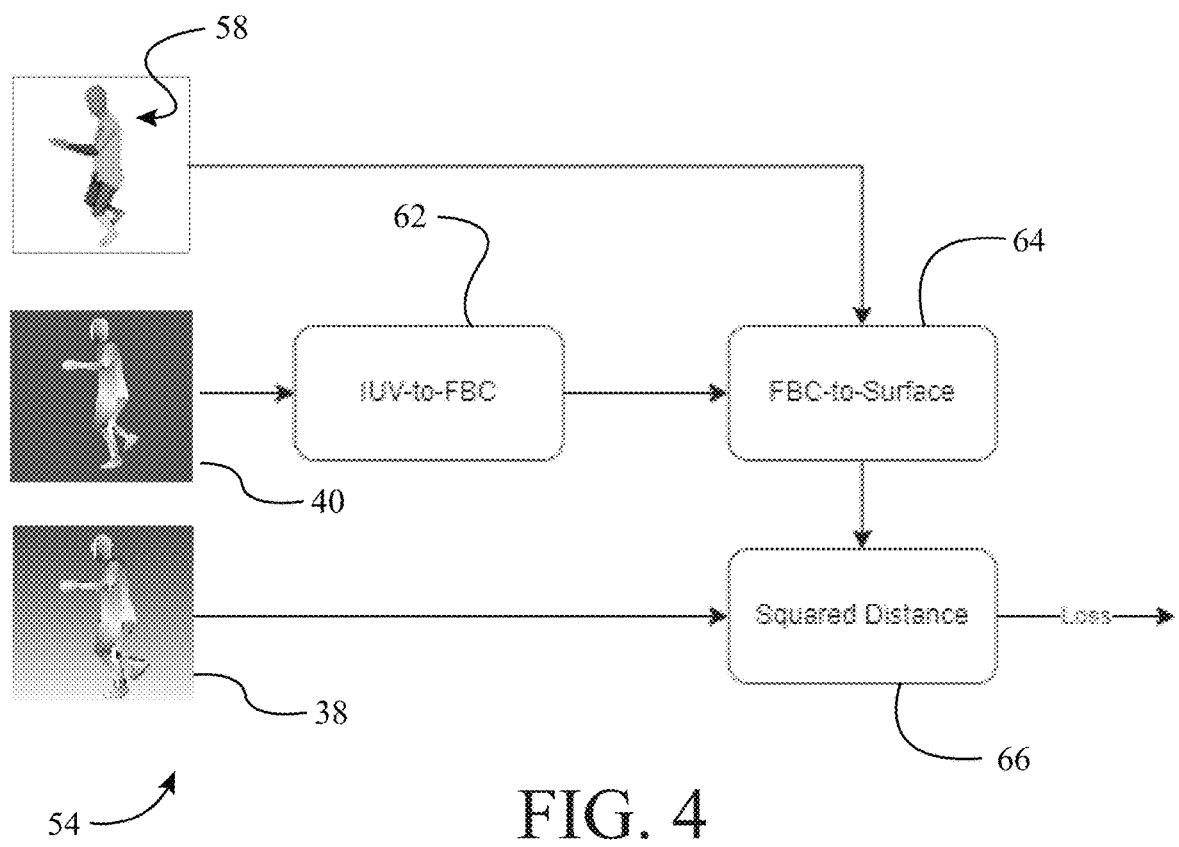
FIG. 4 is a schematic diagram illustrating the functionality of the depth loss module of the system depicted in FIG. 3.

In the illustrative embodiment, with reference to FIG. 4, in the IUV-to-FBC module 62, the IUV value of each pixel in the IUV map 40 is transformed to face barycentric coordinates over mesh vertices. Face barycentric coordinates define a 3D position as a weighted sum of three vertices of a particular face. In the illustrative embodiment, in the FBC-to-Surface module 64, face barycentric coordinates are applied over the mesh 58 predicted by the human mesh estimator 52 so as to find the position of each pixel on the mesh surface. Then, in module 66, summation over pixels of the squared distances between the 3D position on the mesh surface and the position defined by the depth map 38 are used to determine the depth loss.

In the illustrative embodiment, the Depth Loss 54 provides an error signal through backpropagation. Backpropagation is an optimization algorithm that is suitable for neural networks, and uses a differential loss function. In equation (1), the estimated 3D positions of the vertices for image i are compared to the 3D ground truth generated from the depth map and the IUV map. In Depth Loss 54, each 3D position is paired with a vertex on the mesh. The 3D ground truth ($D^{3D}$) corresponds to a 3D mesh portion. Equation (1) is defined over 3D positions, N in equation (1) is the number of frames. In equation (1), $V_i$ are the mesh surface points (3D representation of human body). Depth Loss 54 needs depth information from either the camera or a depth estimation model. Depth Loss 54 is defined over a single frame for a single frame (3D vertex positions are compared with corresponding depth values). With Depth Loss 54, it is determined if the 3D position aligns with the depth value (i.e., it is determined if there is x, y to depth correspondence). The Depth Loss 54 compares each frame by corresponding depth values.

8. System Rigid Transform Loss

In the illustrative embodiment, Rigid Transform Loss 56 is based on the idea that segments of the human body act as approximately rigid bodies. For the mesh predictions and depth annotations for a pair of frames, the rigid transformations which human body segments go through should coincide.

Based on this, in the illustrative embodiment, a module Depth-to-RTs may calculate rigid transformations defined by a rotation matrix R and a translation vector t for each body part as follows: Given two samples $(I_i,D_i,S_i)$ and $(I_j,D_j,S_j)$, for the body part k, the module first finds pixel correspondences $(p^l_i,p^l_j)$ between $S_i$ and $S_j$ such that I values of the pixels are equal to k and the distance between their UV coordinates are smaller than a threshold value. These pairs can be calculated by comparing all the pixels in each IUV map or IUV map, can be discretized, and comparisons can be calculated within each discrete UV grid. Once a set of L pixel correspondences for part k is obtained, rigid transformation of body part k between two samples calculated from 3D points back-projected by a function P which is essentially an inverse intrinsic matrix with fixed parameters, based on the depth map source. If we define $x^l_i$=P(D $(p^l_i)$) to be the 3D point corresponding to pixel $p^l_i$, the kth rigid transformation is able to be calculated by minimizing the following sum:

$$R^k_{i \to j}, t^k_{i \to j} = \mathrm{argmin}_{R,t} \frac{1}{L}\sum_{1}^{L}\|Rx^l_i + t - x^l_j\|^2 \quad (2)$$

which can be solved by singular value decomposition.

In the illustrative embodiment, equation (2) defines the functionality of the Depth-to-RT module. The Depth-to-RT module obtains two partial meshes (applied to two frames to find pixel correspondence between two frames). The pixel correspondences are the 2D locations of body parts in two images. The Depth-to-RT module receives input data from the depth map and IUV map of each frame. The Depth-to-RT module determines if the modeled body parts obey rigid transformation movements. Equation (2) defines how the rotational and translational matrix is calculated (it is a minimization problem, the objective to minimize the right hand side of the equation). With the Depth-to-RT module, rotation and translation are calculated from the depth map for two frames (it is calculated for visible body parts only). Equation (2) summarizes motion information in 3D. Equation (2) may be calculated before training. For example, in Equation (2), suppose that $x_i$ is elbow position at the beginning of the video in 3D, and that $x_j$ is elbow position at the end of the video in 3D.

Once part rigid transformations are obtained this way, the Rigid Transform Loss module 56 simply applies the transformations to mesh vertices $V_i$ from the first sample based on their part indices, and then penalizes the difference between this warped mesh and the mesh obtained from the second sample $V_j$. For the pair i, j then, the loss is defined as:

$$\mathcal{L}_{rt}(i, j) = \frac{1}{M}\sum_{m=1}^{M}\|R^{part(m)}_{i \to j}V_{i,m} + T^{part(m)}_{i \to j} - V_{j,m}\|^2 \quad (3)$$

where M is the number of vertices, part(m) is the part index of the mth vertex and $V_{i,m}$, $V_{j,m}$ are 3D positions of mth vertices of $V_i$, $V_j$. Total loss over selected N number of pairs P will be:

$$\mathcal{L}_{rt} = \frac{1}{N}\sum_{i,j \in P}\mathcal{L}_{rt}(i, j) \quad (4)$$

Figure 5:
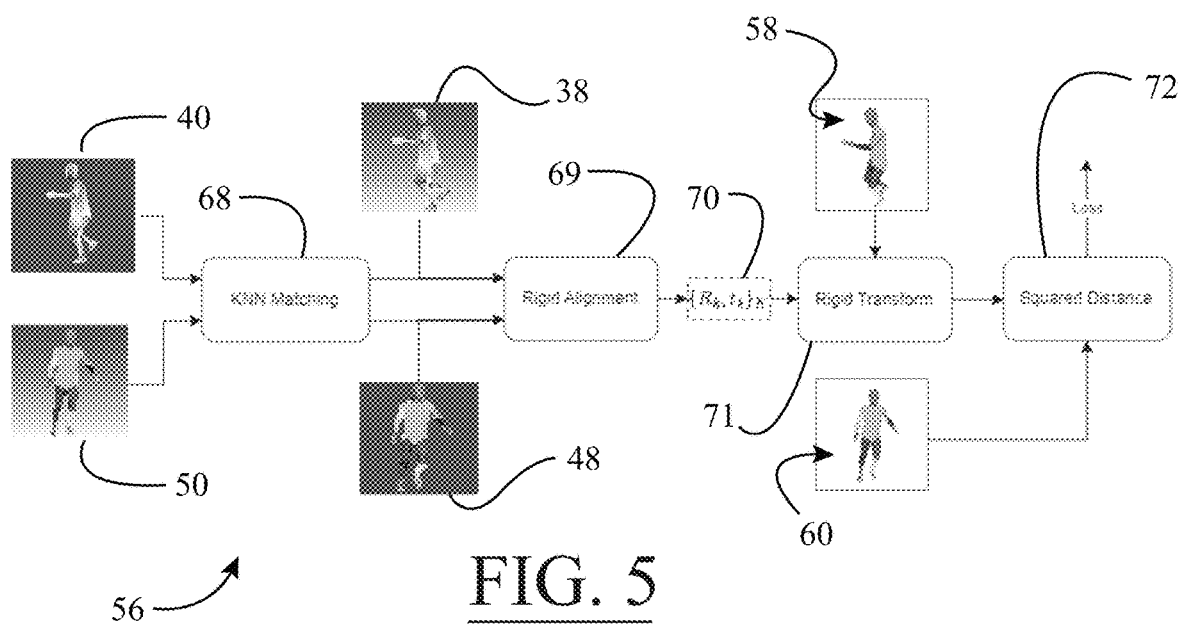
FIG. 5 is a schematic diagram illustrating the functionality of the rigid transform loss module of the system depicted in FIG. 3.

With reference to FIG. 5, another illustrative manner in which the Rigid Transform Loss 56 may be calculated will be described. Initially, in the KNN Matching module 68 of FIG. 5, pixels of two frames are matched by doing a KNN search on IUV maps 40, 50 of the frames so as to generate a set of pixel pairings between two frames. Then, rigid alignment 69 is performed for each body part as defined by UV part decomposition in the following manner: (i) pixel pairs belonging to that body part are selected, (ii) two sets of depth points from the selected pixel pairs, one of the first frame and one of the second frame are generated using depth maps 38, 40, (iii) a rigid transformation that consists of a rotation and a translation 70 from the first set of depth points to the second set of depth points is calculated by singular value decomposition such that the mean squared distance between the two sets of depth points is minimized, and (iv) K (number of body parts) rigid transformation 71 is obtained this way. Referring again to FIG. 5, it can be seen that K rigid transformations 71 are then applied to the mesh prediction 58 of the first frame part by part. Finally, the mean squared distance 72 between the vertices of the transformed first frame mesh, and second frame mesh 60 is the rigid transform loss.

In the illustrative embodiment, the Rigid Transform Loss 56 provides motion information, and is similar to Depth Loss 54 in certain ways. The Rigid Transform Loss 56 considers the 3D movement of body segments between two frames. The shape of a rigid or solid object cannot be changed by the rotation and translation of the object. With Rigid Transform Loss 56, the same vertex point is tracked during the motion of the body (looking at UV correspondence). In Equation (3), R, $V_{i,m}$, and T are motion ground truth values. In general, for Rigid Transform Loss 56, depth information is gathered for pixels, partial meshes are constructed from two frames, and then a loss is defined over the predictions where the predictions are forced to be consistent with the rigid transformations ground truth.

9. System Model Update

In the illustrative embodiment, total loss term of the system is the weighted summation of the three loss terms:

$$L_{total} = \alpha_{depth} L_{depth} + \alpha_{rt} L_{rt} \quad (5)$$

where $\alpha_{depth}$, $\alpha_{rt}$ are loss weights governing the effect of each term in the training. The summed total losses operate as a training signal for the human mesh estimator. The system supervises/trains a human mesh estimator using depth information.

In the illustrative embodiment, through a Backpropogation algorithm, gradient of the estimator E with respect to the total loss is calculated. Then, the model is updated by the gradient descent rule:

$$E := E + \lambda \frac{dL_{total}}{dE} \quad (6)$$

where $\lambda$ is the possibly adaptive learning rate.

Equation (6) is the gradient of the loss function. During optimization, the gradient gets smaller and smaller, until reaching the minimum point of the function. The gradient should be equal to zero for the minimum point of function. Equation (6) is iterated many times so that the neural network gets better and better. In Equation (6), E represents the parameters of the neural network that are being optimized. The objective is to find parameters that minimize the loss function.

10. Two-Dimensional Keypoint Loss

Figure 7:
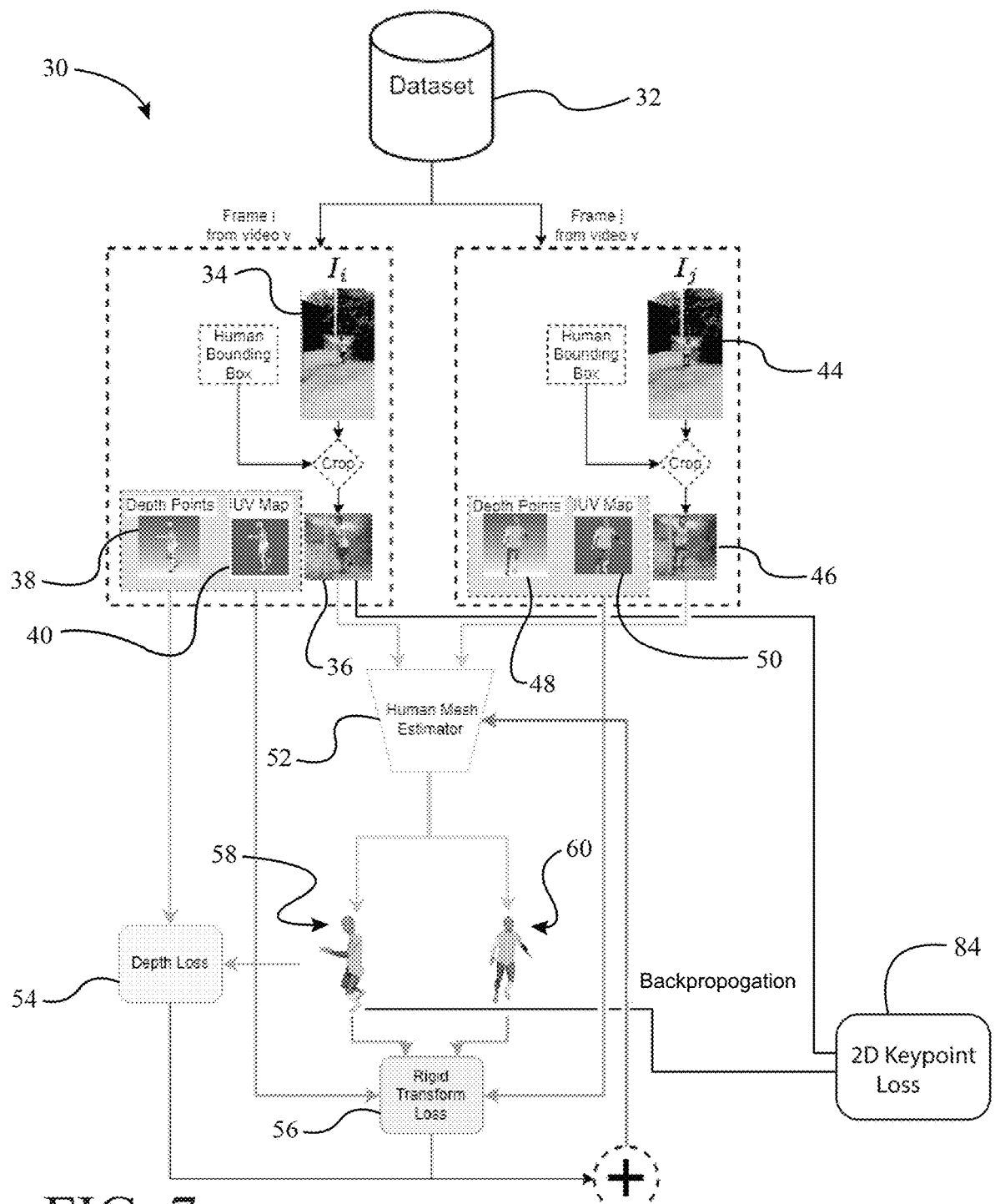
FIG. 7 is a schematic diagram of the overall architecture of the system described herein during the training thereof, according to another illustrative embodiment of the invention.

In a further illustrative embodiment, referring to FIG. 7, the data processor of the system is further configured to execute computer executable instructions for generating another training signal for input into the Human Mesh Estimator 52 by using a 2D Keypoint Loss module 84 that compares a first set of two-dimensional image-based keypoints to a second set of two-dimensional model-based keypoints. In this illustrative embodiment, the data processor may be configured to estimate the first set of two-dimensional image-based keypoints from at least one of the first image data 36 or the second image data 46 using a two-dimensional keypoint estimator. Alternatively, or in addition to using the two-dimensional keypoint estimator, the data processor may be configured to estimate the first set of two-dimensional image-based keypoints from a training dataset that comprises two-dimensional ground truth keypoints. In this illustrative embodiment, the data processor may be configured to estimate the second set of two-dimensional model-based keypoints by projecting the second set of two-dimensional model-based keypoints from the human mesh model 58. In this illustrative embodiment, when generating the training signal for input into the Human Mesh Estimator 52 using the two-dimensional keypoint loss module, the data processor is configured to minimize numerical differences between corresponding keypoints of the first set of two-dimensional image-based keypoints and the second set of two-dimensional model-based keypoints so as to ensure a precise alignment between the human mesh model 58 and real-world images in the video.

As such, in this further illustrative embodiment, 2D keypoint loss is used to compare the detected 2D keypoints (such as joints) in an image with the keypoints projected from a 3D model in order to improve the accuracy of 3D human body modeling from 2D images. As explained above, in this illustrative embodiment, the two-dimensional image-based keypoints are obtained by a 2D keypoint estimator or datasets that has 2D ground truth keypoints. By minimizing the differences between the two-dimensional image-based keypoints and the two-dimensional model-based keypoints, 2D keypoint loss ensures a precise alignment between the 3D model and the real-world images in the video. One of the significant advantages of 2D keypoint loss is its occlusion robustness, meaning that 2D keypoint loss can handle situations where body parts are partially hidden or obscured in the image.

In addition, in this further embodiment, the data processor may be configured to estimate the second set of two-dimensional model-based keypoints by additionally considering a movement of the human mesh model over a period of time. That is, keypoint locations in several consecutive frames of the video are used to predict where the same keypoints would be in a subsequent frame (e.g., based on path and velocity). Advantageously, the use of this temporal information results in the more accurate estimation of keypoint locations.

While reference is made throughout this disclosure to, for example, "an illustrative embodiment", "one embodiment", or a "further embodiment", it is to be understood that some or all aspects of these various embodiments may be combined with one another as part of an overall embodiment of the invention. That is, any of the features or attributes of the aforedescribed embodiments may be used in combination with any of the other features and attributes of the aforedescribed embodiments as desired.

Each reference listed below is expressly incorporated by reference herein in its entirety:

[1] Riza Alp Güler, Natalia Neverova, and Iasonas Kokkinos. Densepose: Dense human pose estimation in the wild. 2018.

[2] Yasamin Jafarian and Hyun Soo Park. Learning high fidelity depths of dressed humans by watching social media dance videos. In *The IEEE Conference on Computer Vision and Pattern Recognition (CVPR)*, 2021.

[3] Christoph Mayer, Martin Danelljan, Danda Pani Paudel, and Luc Van Gool. Learning target candidate association to keep track of what not to track. *arXiv preprint arXiv:2103.16556*, 2021.

[4] Yaadhav Raaj, Haroon Idrees, Gines Hidalgo, and Yaser Sheikh. Efficient online multi-person 2d pose tracking with recurrent spatio-temporal affinity fields. In *Proceedings of the IEEE/CVF Conference on Computer Vision and Pattern Recognition*, pages 4620-4628, 2019.

[5] Sicong Tang, Feitong Tan, Kelvin Cheng, Zhaoyang Li, Siyu Zhu, and Ping Tan. A neural network for detailed human depth estimation from a single image. In *Proceedings of the IEEE/CVF International Conference on Computer Vision*, pages 7750-7759, 2019.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A system for training neural networks that predict the parameters of a human mesh model, the system comprising:
   at least one camera, the at least one camera configured to capture a sequence of frames of a video, the sequence of frames of the video including at least a first frame and a second frame; and
   a data processor including at least one hardware component, the data processor configured to execute computer executable instructions, the computer executable instructions comprising instructions for:
   receiving the first frame and the second frame of the video from the at least one camera;
   extracting first image data from the first frame of the video;
   extracting second image data from the second frame of the video;
   inputting the sequence of frames of the video into a human mesh estimator module, the human mesh estimator module estimating mesh parameters from the sequence of frames of the video so as to determine a human mesh model;
   generating a training signal for input into the human mesh estimator module by using a rigid transform loss module that calculates rigid transformations between the first and second frames of the sequence of frames for one or more body parts, warps a predicted mesh for the first frame from the human mesh model using the rigid transformations, and compares the warped mesh with a predicted mesh for the second frame from the human mesh model; and
   generating another training signal for input into the human mesh estimator module by using a two-dimensional keypoint loss module that compares a first set of two-dimensional image-based keypoints to a second set of two-dimensional model-based keypoints.

2. The system according to claim 1, wherein the data processor is further configured to estimate the first set of two-dimensional image-based keypoints from at least one of the first image data or the second image data using a two-dimensional keypoint estimator.

3. The system according to claim 1, wherein the data processor is further configured to estimate the first set of two-dimensional image-based keypoints from a training dataset that comprises two-dimensional ground truth keypoints.

4. The system according to claim 1, wherein the data processor is further configured to estimate the second set of two-dimensional model-based keypoints by projecting the second set of two-dimensional model-based keypoints from the human mesh model.

5. The system according to claim 1, wherein, when generating the training signal for input into the human mesh estimator module using the two-dimensional keypoint loss module, the data processor is further configured to minimize numerical differences between corresponding keypoints of the first set of two-dimensional image-based keypoints and the second set of two-dimensional model-based keypoints so as to ensure a precise alignment between the human mesh model and real-world images in the video.

6. The system according to claim 1, wherein the data processor is further configured to generate depth maps and IUV maps for the first frame and the second frame of the video.

7. The system according to claim 6, wherein the data processor is configured to generate the depth maps using a human depth estimator module.

8. The system according to claim 6, wherein the at least one camera comprises an RGB-D camera that outputs both image data and depth data, and the data processor is configured to generate the depth maps using the depth data from the RGB-D camera.

9. The system according to claim 1, wherein the data processor is configured to estimate the second set of two-dimensional model-based keypoints by additionally considering a movement of the human mesh model over a period of time.

* * * * *